United States Patent [19]

Matsuo et al.

[11] Patent Number: 5,202,588
[45] Date of Patent: Apr. 13, 1993

[54] SUBSTRATE BIAS CIRCUIT

[75] Inventors: Ryosuke Matsuo; Masaru Koyanagi, both of Yokohama, Japan

[73] Assignee: Kabushiki Kaisha Toshiba, Kawasaki, Japan

[21] Appl. No.: 827,267

[22] Filed: Jan. 29, 1992

[30] Foreign Application Priority Data

Jan. 29, 1991 [JP] Japan .................................. 3-28106

[51] Int. Cl.$^5$ .............................................. H03K 3/01
[52] U.S. Cl. ............................. 307/296.2; 307/296.8
[58] Field of Search .......................... 307/296.2, 296.8

[56] References Cited

U.S. PATENT DOCUMENTS

| | | | |
|---|---|---|---|
| 4,229,667 | 10/1980 | Heimbigner et al. | 307/296.2 |
| 4,471,290 | 9/1984 | Yamaguchi | 307/296.2 |
| 4,628,214 | 12/1986 | Lenschner | 307/296.2 |
| 4,705,966 | 11/1987 | Van Zanten | 307/296.2 |
| 4,740,715 | 4/1988 | Okada | 307/296.2 |

*Primary Examiner*—William L. Sikes
*Assistant Examiner*—Sinh Tran
*Attorney, Agent, or Firm*—Foley & Lardner

[57] ABSTRACT

There is disclosed a substrate bias circuit including an oscillation circuit oscillating at a predetermined frequency; a control signal generation circuit operative to generate a control signal for changing, on the basis of an output from the oscillation circuit, a substrate potential in a direction to ensure a threshold level of a transistor so that it becomes greater; and a charge pump circuit including a capacitor and operative to control discharge of the capacitor by said control signal to thereby change the substrate potential.

5 Claims, 6 Drawing Sheets

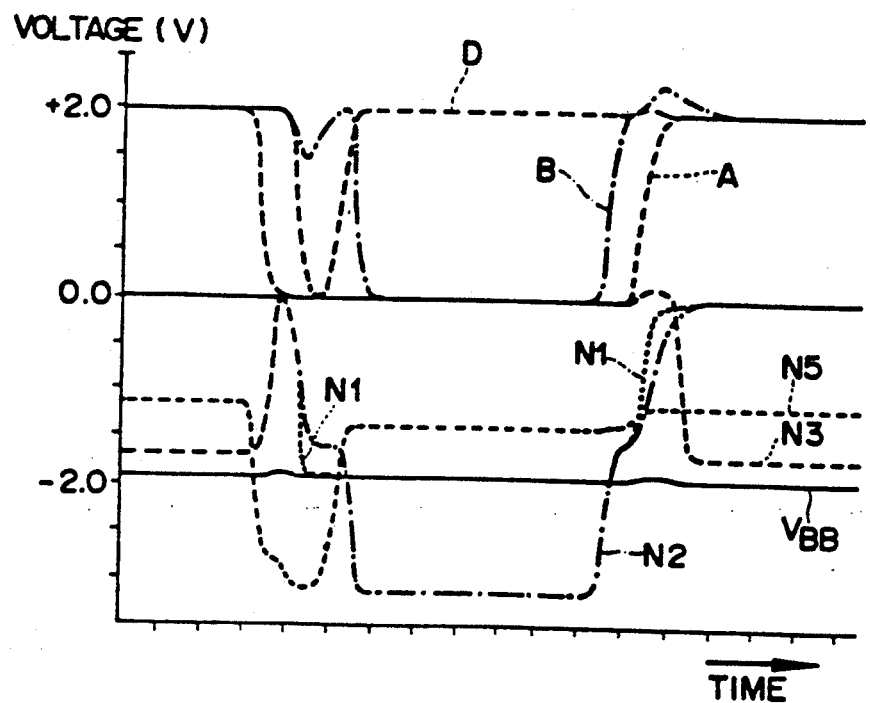
F I G. 4

SUBSTRATE BIAS CIRCUIT

BACKGROUND OF THE INVENTION

This invention relates to a substrate bias circuit for setting a potential of a substrate in a semiconductor integrated circuit, etc., and more particularly, to a substrate bias circuit for use in a semiconductor integrated circuit driven by a single power supply.

In a MOSFET integrated circuit driven by a single power supply, a certain voltage is applied to a substrate terminal for the purpose of controlling a threshold voltage of a MOS transistor. Namely, in the case of an N-channel transistor formed on a P-type substrate, a negative potential is applied from the source terminal to the substrate terminal. On the other hand, in the case of a P-channel transistor on an N-channel substrate, a positive potential is applied from the source terminal to the substrate terminal. The circuit for generating such a bias voltage is called a substrate bias circuit.

A conventional substrate bias circuit is comprised of an oscillation circuit oscillating at a predetermined frequency, a control signal generation circuit supplied with this oscillation output, to generate a control signal, and a charge pump circuit for pulling down a substrate potential in response to this control signal.

However, in such a conventional substrate bias circuit, the efficiency of the charge pump circuit is poor in the state where the power supply voltage is low is poor. As a result, a sufficient bias effect cannot be provided.

SUMMARY OF THE INVENTION

An object of this invention is to provide a substrate bias circuit which improves the pumping efficiency of a charge pump circuit where the power supply voltage is low.

According to the present invention, there is provided a substrate bias circuit comprising: an oscillation circuit oscillating at a predetermined frequency; a control signal generation circuit operative to generate a control signal for changing, on the basis of an output from the oscillation circuit, a substrate potential in a direction to ensure a threshold level of a transistor so that it becomes greater; and a charge pump circuit including a capacitor and operative to control discharge of the capacitor by the control signal to thereby change the substrate potential at two stages.

In accordance with this invention, a control circuit additionally provided on the gate side of a first transistor (T5) forcedly controls for a moment the potential on the gate of the first transistor with a view to allowing the first transistor to be conductive for a short time prior to control of a gate of a second transistor through a second capacitor (C2) to allow the first transistor (T5) to be placed in a more completely conductive state to provide a potential on a first capacitor (C1) to the side of a second capacitor (C2), thus permitting the gate of the second transistor (T2) to be securely biased in a two-stage manner.

The substrate bias circuit of this invention is of a structure to control the gate of the first transistor (T5) for generating a great gate bias with a view to allowing the second transistor (T2) operative to sink charges from the output terminal. Accordingly, even in the case where the power supply voltage of the integrated circuit is low, the pumping efficiency of the charge pump circuit is high. Namely, the integrated circuit is sufficiently operable even by a low power supply voltage.

Thus, also in starting the circuit operation after powered, the node of the output terminal can be quickly set to a predetermined level.

BRIEF DESCRIPTION OF THE DRAWINGS

In the accompanying drawings:

FIG. 4 is a waveform diagram showing signal waveforms of the circuit of the embodiment;

DESCRIPTION OF THE PREFERRED EMBODIMENTS

Preferred embodiments of this invention will now be described with reference to the attached drawings.

Figure 1:
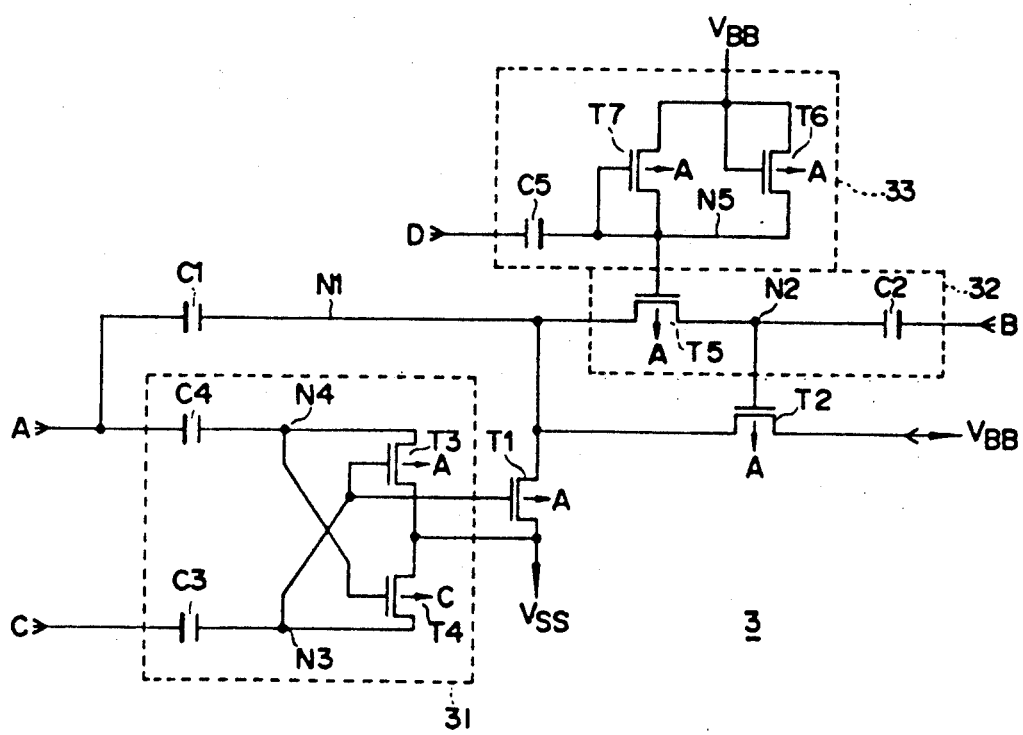
FIG. 1 is a circuit diagram showing a charge pump circuit according to an embodiment of this invention.
Figure 2:
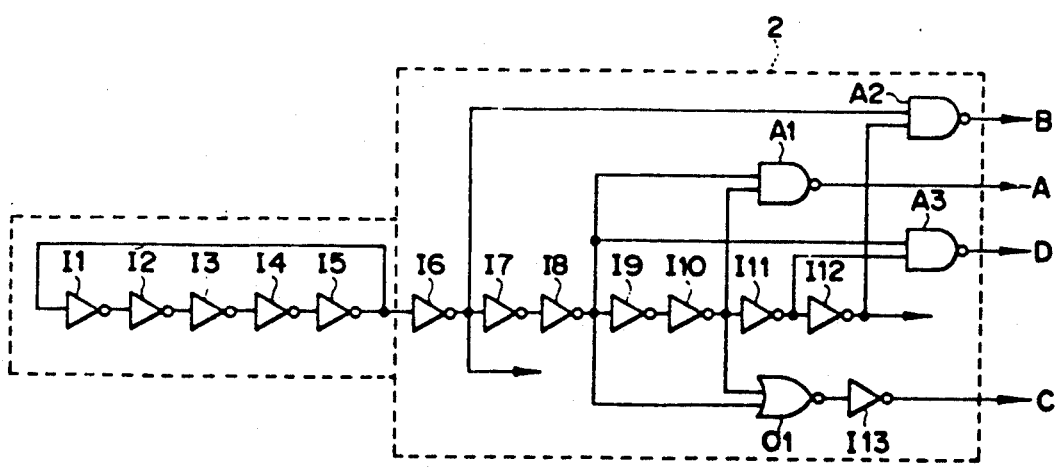
FIG. 2 is a circuit diagram showing an oscillation circuit and a control signal generation circuit in the embodiment of this invention.

A substrate bias circuit is comprised of an oscillation circuit 1 and a control signal generation circuit 2 shown in FIG. 2, and a charge pump circuit 3 shown in FIG. 1. The oscillation circuit 1 is of a structure including inverters I1 to I5 connected in series, and such that an output of the inverter I5 is fed back as an input of the inverter I1. Thus, the oscillation circuit 1 oscillates at a predetermined frequency. An output of the inverter I5 is delivered to the control signal generation circuit 2 as an oscillator output OSC.

The control signal generation circuit 2 comprises inverters I6 to I12 connected in series, a NAND gate A1 supplied with both outputs from the inverters I8 and I10, a NAND gate A2 supplied with both outputs from the inverters I6 and I12, a NOR gate O1 supplied with both outputs from the inverters I8 and I10, and an inverter I13 for inverting an output from the NOR gate O1. The inverters I7 to I12 of the above-mentioned components form a signal delay circuit. Respective outputs from the NAND gates A1 and A2 and the inverter I13 are delivered as control signals A, B and C to the charge pump circuit 3, respectively. Furthermore, a control signal D is provided by an output from NAND gate A3 supplied with both outputs from the inverters I8 and I11 of the control signal generation circuit 2 shown in FIG. 2.

The charge pump circuit 3 sinks charges from the output terminal $V_{BB}$, serving as the node $V_{BB}$, into the capacitor C1 through the transistor T2 to discharge them to the ground potential $V_{SS}$ side through the transistor T1, thus to pull down a potential on the output terminal $V_{BB}$ to a negative potential lower than the ground potential. In order to allow the transistors T1 and T2 to be conductive interchangeably, there are provided a gate control circuit 31 for controlling the gate of the transistor T1 by control signals A and C, and a gate control circuit 32 for controlling the gate of the transistor T2 by control signals A and B, and a potential on the output terminal $V_{BB}$.

Namely, the charge pump circuit 3 includes a pump circuit comprised of a transistor T1 having a source and a drain connected between the node N1 and the ground potential $V_{SS}$ terminal and a gate connected to the node N3, a transistor T2 having a drain and a source connected between the node N1 and the output terminal $V_{BB}$ and a gate connected to the node N2, and a capacitor C1 of a relatively large capacity, having one end to which the control signal A is applied and the other connected to the node N1; and the gate control circuit 32 comprised of a transistor T5 having a drain and a source connected between the nodes N1 and N2 and a gate connected to the node N5, and a capacitor C2 having one end to which the control signal B is applied and the other end to which the node N2 is connected. The charge pump circuit 3 further includes the gate control circuit 31 comprised of a capacitor C3 having one end to which the control signal C is applied and the other end connected to the node N3, a capacitor C4 having one end to which the control signal A is applied and the other end connected to the node N4, a transistor T3 having a source and a drain connected between the node N4 and the ground potential $V_{SS}$ and a gate connected to the node N3, and a transistor T4 having a source and a drain connected between the node N3 and the ground potential $V_{SS}$ and a gate connected to the node N4. The charge pump circuit 3 further includes a control circuit 33 for controlling the gate of the transistor T5. This gate control circuit 33 is comprised of a transistor T6 having a source and a gate connected to the output terminal $V_{BB}$ and a drain connected to the gate of the transistor T5, a transistor T7 having a source connected to the output terminal $V_{BB}$ and a gate and a drain connected to the gate of the transistor T5, and a capacitor C5 having one end to which the control signal D is applied and the other end connected to the gate of the transistor T5. The junction of the gate of the transistor T5 serves as a node N5. The transistors T6 and T7 are subjected to the so-called diode connection, thus serving to prevent a potential on the node N5 from being placed in a floating state.

The transistors used in the embodiments are of P channel enhancement type. Suitable bias voltages are applied to substrate of respective transistors. For example, the signal C is applied to the substrate of T4, and the signal A is applied to the substrate of other transistors.

The circuit operation by the gate control circuit 33 with now be described with reference to signal waveforms of respective points of FIG. 3.

In a steady state of the circuit, it is now assumed that potentials on respective components of the circuit are set as follows: nodes N1, N2 and N4 are set to a potential $V_{SS}$, the node N3 is set to a potential $-i.V_{dd}$, and the output terminal $V_{BB}$ is set to a potential $-V_{BB}$. The above-mentioned i represents a coupling ratio of the capacitor C, which ordinarily takes a value ranging from 0.8 to 1.0. Other coupling ratios which will be described later take a value in the same range as above. Accordingly, the transistor T1 is in an ON state, the transistor T2 is in an OFF state, the transistor T3 is in an ON state, the transistor T4 is in an OFF state, and the transistor T5 is in an ON state.

Figure 3:
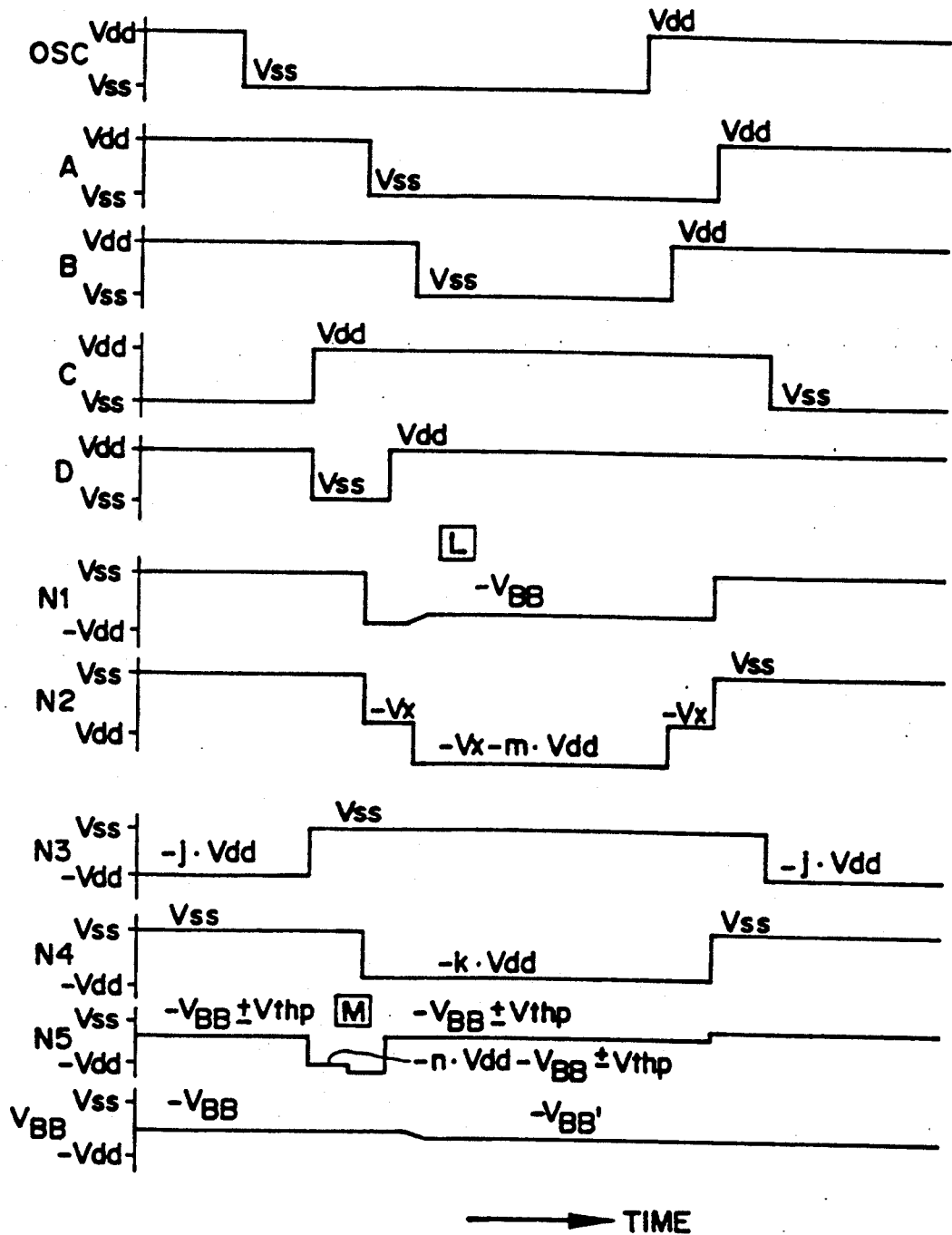
FIG. 3 is a waveform diagram showing signal waveforms of respective components of the charge pump circuit of FIG. 1.

In such a state, when an output OSC of the oscillation circuit 1 falls, as shown in FIG. 3, the control signal C rapidly rises to a power supply voltage $V_{dd}$ of the circuit. The voltage $V_{dd}$ of the control signal C is applied to the node N3 through the capacitor C3. A potential on the node N3 is raised or pulled up from a potential of $-i.V_{dd}$ to a ground level $V_{SS}$. Thus, the transistors T1 and T3 of which gates have been at the ground level shift from an ON state to an OFF state. As the result of the fact that the transistor T1 becomes non-conductive, the discharge of charges from the capacitor C1 to the ground potential $V_{SS}$ side is prevented.

The node N5 of the gate control circuit 33 is maintained so that its potential falls within a range $-V_{BB}\pm V_{thp}$) by the transistors T5 and T6 for the prevention of floating. When the control signal D falls from the power supply voltage $V_{dd}$ to the ground potential $V_{SS}$, the potential on the node N5 becomes equal to a potential expressed as $(-n.V_{dd}-V_{BB}\pm V_{thp})$ where the coupling ratio of the capacitor C5 is represented by n. Thus, since the potential is further pulled down by a potential $(-n.V_{dd}\pm V_{thp})$ for a time period during which at least the control signal D is at the potential $V_{SS}$, as compared to the prior art, a sufficiently great bias is applied to the gate of the transistor T5 connecting the nodes N1 and N2, so the transistors T5 is brought into a more complete conductive state, and a voltage drop between the source and the drain of the transistor T5 is sufficiently low. Accordingly, in the state where the control signal D is at the potential $V_{SS}$, an improvement is made such that a potential on the node N1 is propagated to the node N2 substantially as it is through transistor T5.

Then, it is now assumed that in the state where the control signal D is at the potential $V_{SS}$, the control signal A falls from the potential $V_{dd}$ to the potential $V_{SS}$. At this time, a potential on the node N1 becomes equal to $-j.V_{dd}$. This potential is propagated to the node N2. On the other hand, a potential corresponding to a potential on the output terminal $V_{BB}$ is applied to node N2 through a gate-source voltage of the transistor T5. For this reason, a potential Vx on the node N2, immediately after the level of the control signal A is lowered to the potential $V_{SS}$, takes a value ranging from $(-j.V_{dd})$ to $(-n.V_{dd}-V_{BB}-2V_{thp})$.

When the control signal D rises from the potential $V_{SS}$ to the potential $V_{dd}$, a potential on the node N5 become approximately equal to $-V_{BB}\pm V_{thp}$. Because the gate potential on the node N5 becomes higher than the drain potential on the node N1, transistor T5 is cut OFF. The reason why the transistor T5 is cut OFF is to improve a coupling ratio m for pulling down the potential on the node N2 due to application to the capacitor C2 of the control signal B by cutting off the connection between the capacitor C1 having a large capacity and the capacitor C2 having a capacity lower than that.

Then, the control signal B falls from the potential $V_{dd}$ to the potential $V_{SS}$. As a result, the potential on the node N2 is further pulled down from the potential Vx to $Vx-m.V_{dd}$ by the capacitor C2.

As the result of the fact that the node N2 is greatly biased in a negative direction, the transistor T2 of which gate is connected to the node N2 become completely conductive to connect the node N1 and the output terminal $V_{BB}$. Because the potential on the node N1 is equal to $-j.V_{dd}$, charges are greatly extracted (drawn out) from the output terminal $V_{BB}$ to the node N1 side. As a result, the potential $-V_{BB}$ on the output terminal $V_{BB}$ is pulled down toward the potential $-j.V_{dd}$, resulting in the potential $-V_{BB'}$.

When the output OSC of the oscillation circuit 1 rises, the control signal B rises to the potential $V_{dd}$ subsequently thereto. Thus, the transistor T5 is biased in a forward direction, and becomes conductive. As a result, the potential on the node N2 is pulled up to the potential $(-V_{BB'}-V_{thp})$. For this reason, the transistor T2 becomes non-conductive. Thus, the extraction of charges from the output terminal $V_{BB}$ is completed.

Subsequently, when the control signal A rises to the potential $V_{dd}$, potentials on the nodes N1 and N4 rise to the potential $V_{SS}$. Thus, the transistor T4 is cut OFF.

Then, the control signal C falls down to the potential $V_{SS}$, so the potential on the node N3 becomes equal to $-i.V_{dd}$. Thus, the transistors T1 and T3 become conductive, so the potential on the node N4 becomes equal to the ground potential $V_{SS}$. Accordingly, charges extracted from the output terminal $V_{BB}$ into the capacitor C1 are discharged to the ground potential $V_{SS}$ side through the transistor T1.

In a manner stated above, the capacitor C1 is caused to be charged negatively by the control signal A to control conduction of the transistor T5 by the control signals A and B to provide a gate bias for the transistor T2 at two stages to allow the transistors T1 and T2 to be respectively interchangeably conductive by the control signals C and B, and to thereby realize one cycle of the charge pumping operation. By successively carrying out such an operation, the potential on the output terminal $V_{BB}$ is pulled down to $-j.V_{dd}$.

Figure 5:
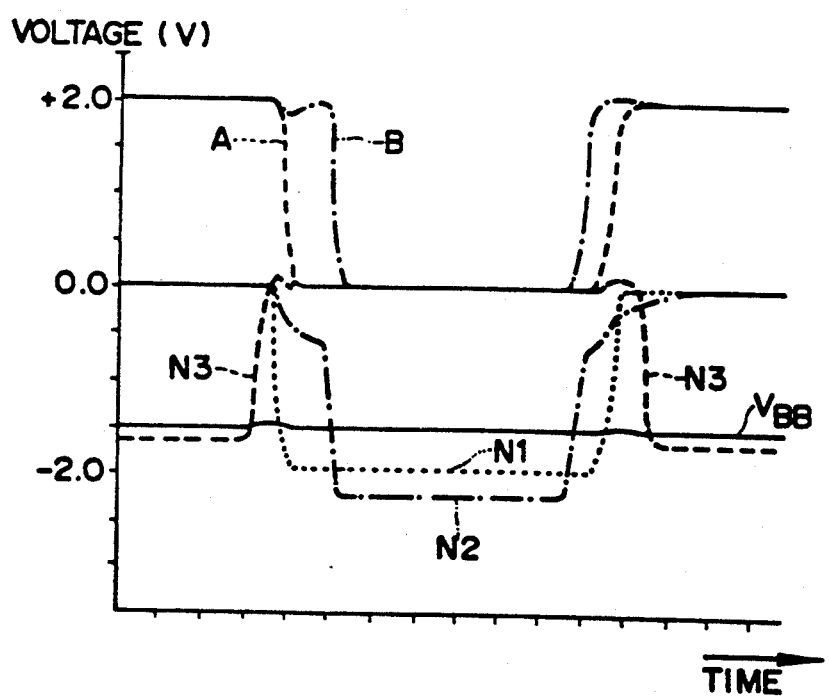
FIG. 5 is a waveform diagram showing signal waveforms in a conventional circuit.

FIGS. 4 and 5 show respective signal waveforms of the circuit of the embodiment of this invention and the conventional circuit in the case where the power supply voltage $V_{dd}$ of the circuit is set to a low value of 2 volts and the potential $V_{BB}$ on the output terminal is zero volts to start the circuit operation, whereby that circuit is brought into a steady state.

It is seen that, in the conventional circuit as shown in FIG. 5, the potential $-V_{BB}$ on the output terminal is not pulled down to the pull-down potential $-V_{dd}$ on the node N1. Since the potential on the node N2 is not sufficiently pulled down, the transistor T2 is not in a completely conductive state. In other words, the reason why the potential $-V_{BB}$ is not sufficiently pulled down is that when the potential on the node N1 is pulled down, the potential on the node N2 which is the gate potential of the transistor T2 is not sufficiently pulled down.

On the contrary, in the circuit of this application shown in FIG. 4, the potential on the node N2 is sufficiently pulled down in a two-stage manner by charges of both the capacitors C1 and C2, so a potential of substantially $-2V_{dd}$ is provided. For this reason, even when a low circuit power supply voltage is employed, the transistor T2 is brought into a complete conductive state. As a result, the potential $-V_{BB}$ on the output terminal is pulled down to the pull-down potential $-V_{dd}$ on the node N1.

Meanwhile, as described above, the transistor T5 has a role such that when the control signal A falls from the potential $V_{dd}$ to the potential $V_{SS}$, the transistor T5 becomes conductive to propagate the potential $-j.V_{dd}$ on the node N1 by the capacitor C1 to the node N2 to carry out one-stage boost, and when the control signal B falls from the potential $V_{dd}$ down to the potential $V_{SS}$, the transistor T5 becomes non-conductive to carry out two-stage boost to add $-m.V_{dd}$ to the potential on the node N2 to provide substantially $-2V_{dd}$.

For this reason, the gate control circuit 33 pulls down the gate potential of the transistor to a value lower than $(-j.V_{dd}-V_{thp})$, in order to allow the transistor T5 to be conductive. This is another embodiment of a control circuit which can function in the same manner as in the case of the gate control circuit 33.

Figure 6:
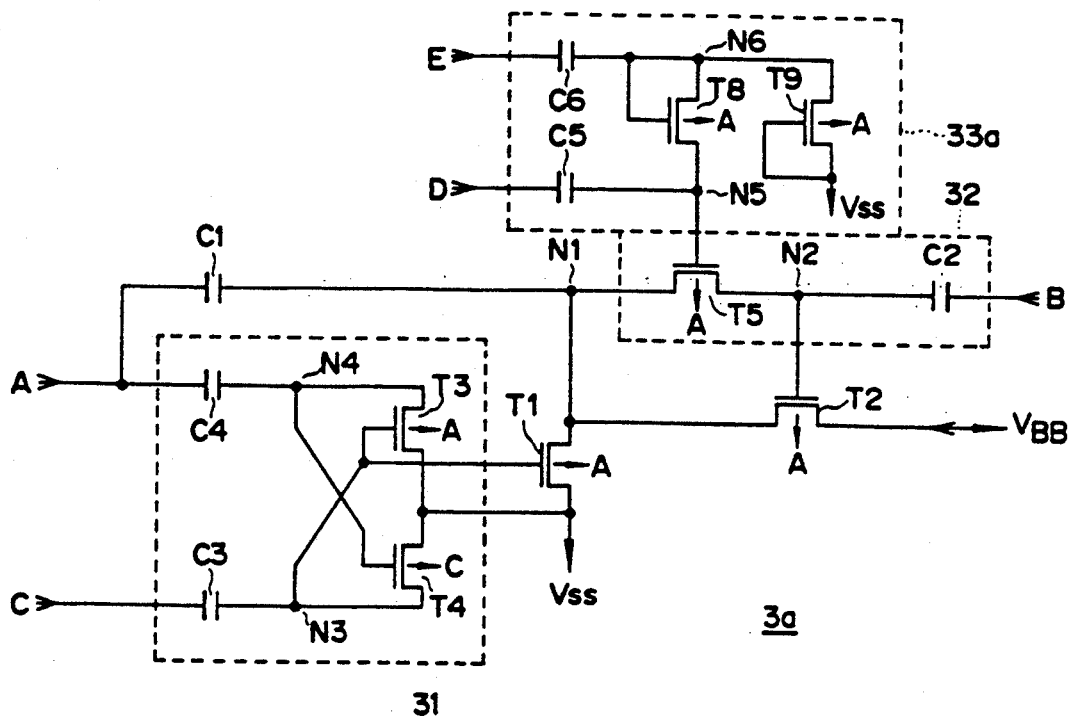
FIG. 6 is a circuit diagram showing another embodiment of a gate control circuit.
Figure 7:
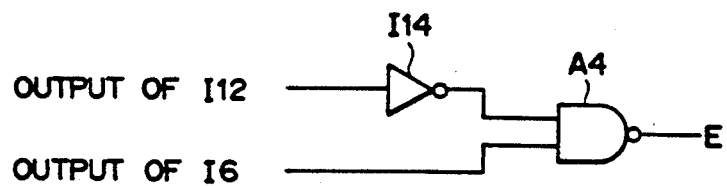
FIG. 7 is a circuit diagram showing a circuit for generating a control signal E.
Figure 8:
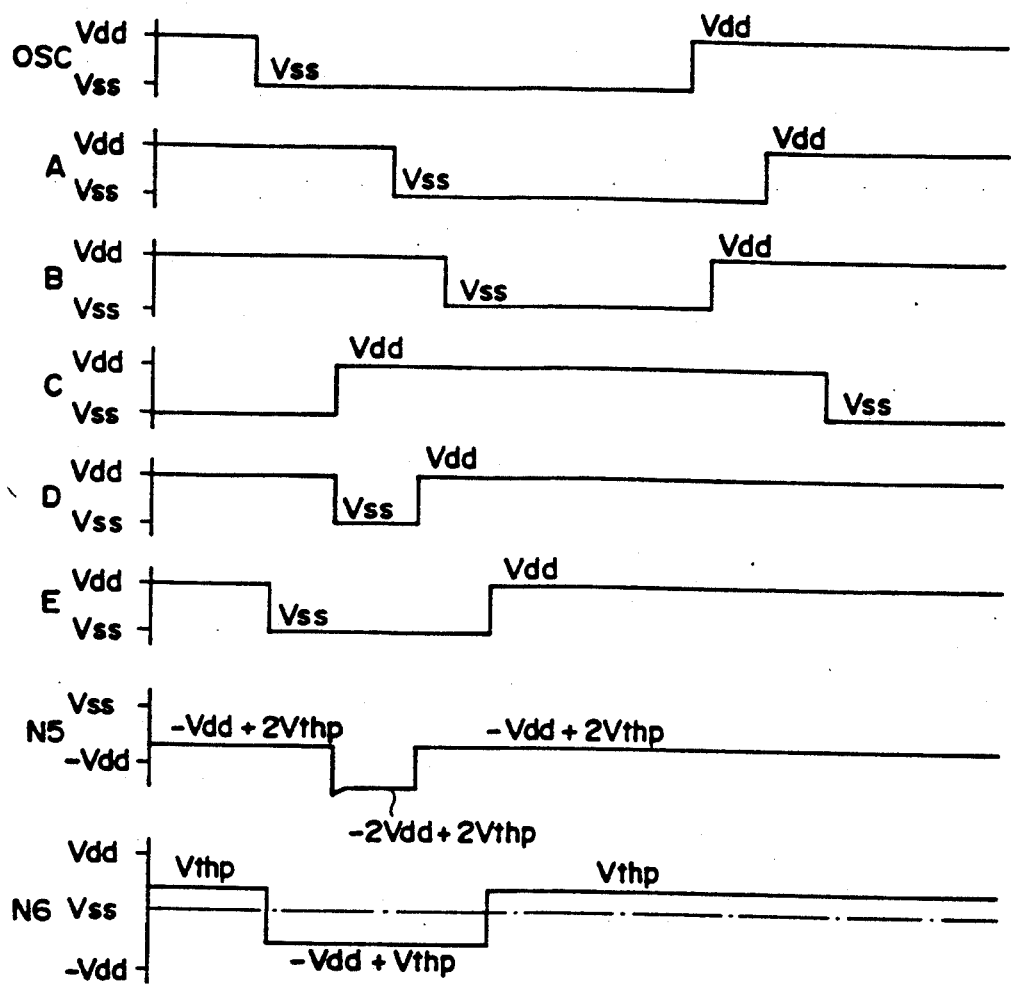
FIG. 8 is a waveform diagram showing signal waveforms of the gate control circuit shown in FIG. 6.

In FIG. 6, the gate control circuit 33a comprises a capacitor C5 having one end to which the control signal D is applied and the other terminal connected to the gate of the transistor T5, a capacitor C6 having one end to which the control signal E is applied and the other end connected to the node N6, a transistor T8 diode-connected between the node N6 and the gate of the transistor T5 in a direction to block a current flowing from the node N6 into the node 5, and a transistor T9 diode-connected between the node N6 and the set potential $V_{SS}$ terminal in a direction to block a current flowing from the ground potential $V_{SS}$ potential into the node N6. The control signal E is at the level of the potential $V_{SS}$ for a long time period including a time period during the control signal D is at the level of the potential $V_{SS}$, as shown in FIG. 8.

Figure 9:
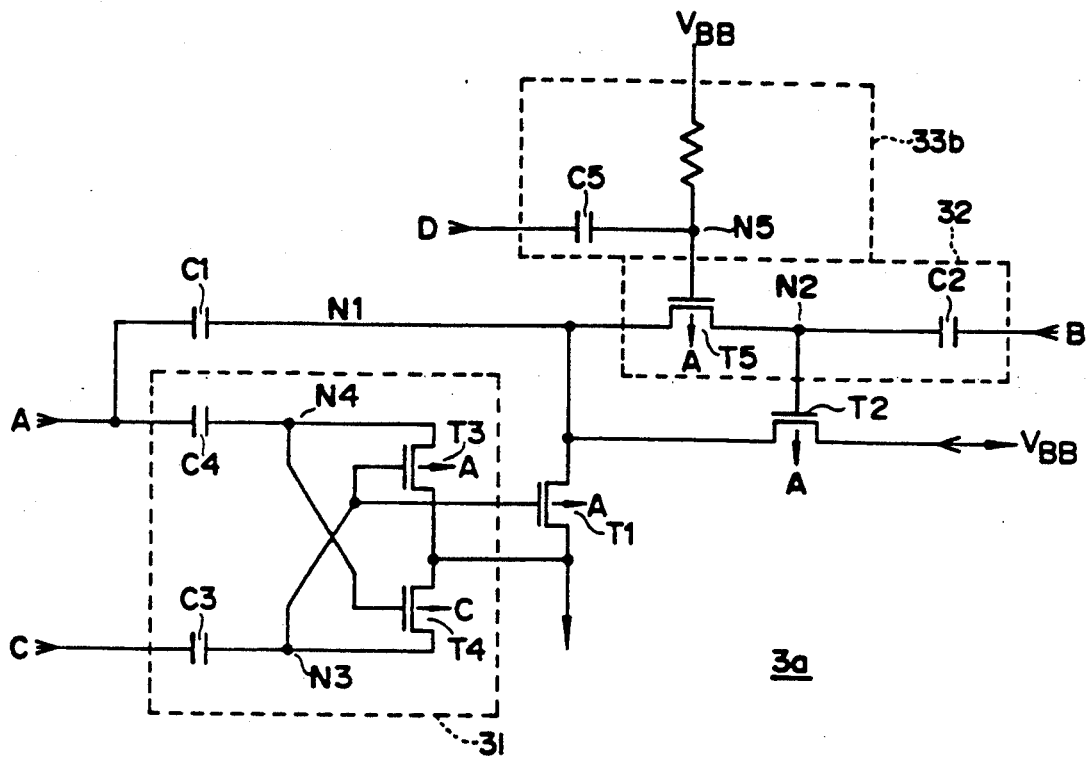
FIG. 9 is a circuit diagram showing a further embodiment of a gate control circuit.

This control signal E can be provided by using a control signal generation circuit 2a supplied with outputs from the inverters I6 and I12 as shown in FIG. 9. Namely, by inputting an output from the inverter I12 to one input terminal of a NAND gate A4 through an inverter I14, and inputting an output from the inverter I6 to the other input terminal of the NAND gate A4, a control signal E is provided to the output terminal of the NAND gate A4.

In the configuration as described above, when a potential $V_{dd}$ is applied to capacitors C5 and C6 by control signals D and E, the transistors T8 and T9 become conductive, so the potential on the node N6 becomes equal to $V_{SS}+V_{thp}$, and the potential on the node N5 becomes equal to $V_{SS}+2V_{thp}$. When the control signal E falls down to the potential $V_{SS}$, the transistor T9 is cut OFF. As a result, the potential on the node N6 becomes equal to substantially $-V_{dd}+V_{thp}$. This potential is propagated to the node N5 through the transistor T8. As a result, the potential on the node N5 becomes equal to $-V_{dd}+2.V_{thp}$. When the control signal D falls from the potential $V_{dd}$ to the potential $V_{SS}$, substantially $-V_{dd}$ is further applied to the node N5. As a result, the transistor T8 is cut OFF. At this time, the potential on the node N5 becomes equal to $-2V_{dd}+2V_{thp}$. As a result, the transistor T5 becomes conductive to propagate the potential of $-V_{dd}$ to the node N2. On the other hand, when the control signal D rises to the potential $V_{dd}$, the potential on the node N5 becomes equal to $-V_{dd}+2.V_{thp}$. As a result, the transistor T5 becomes non-conductive. When the control signal E rises to $V_{dd}$, the potential on the node N6 becomes equal to $V_{SS}+V_{thp}$, but the transistor T8 is cut OFF. The potential on the node N5 is held at $-V_{dd}+2.V_{thp}$. Changes in the level of the potential on the node N5 in a steady state is indicated by N5 of FIG. 8.

FIG. 9 shows a further embodiment of the configuration of the gate control circuit 33 wherein transistors T6 and T7 of the gate control circuit 33 are replaced by a resistor, respectively.

Figure 10:
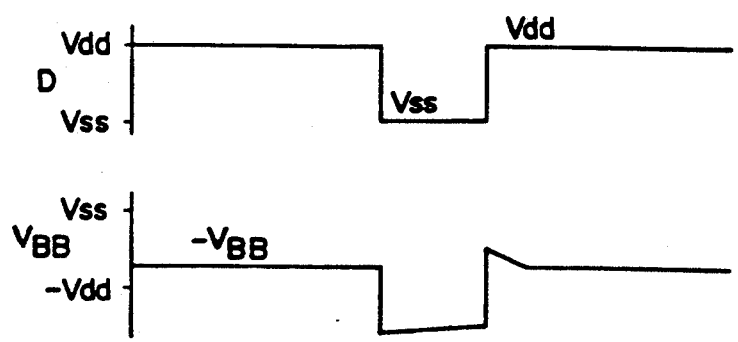
FIG. 10 is a waveform diagram showing waveforms of the gate control circuit shown in FIG. 9.

When such a configuration is employed, the potential on the node N5 is $-V_{SS}$ at the beginning time when the circuit is powered, but after the potential on the output terminal $V_{BB}$ is pulled down to $-V_{dd}$, the potential on the node N5 can be set to substantially $-2.V_{dd}$ for a time period during which the control signal D is at the level of the potential $V_{SS}$ as shown in FIG. 10.

It is to be noted that while explanation has been given in the above-described respective embodiments in connection with the case where P-channel FET transistors are formed to constitute a substrate bias circuit, even if N-channel FET transistors are formed to constitute the above-described substrate bias circuit, similar advantages can be provided.

What is claimed is:

1. A substrate bias circuit comprising: an oscillation circuit oscillating at a predetermined frequency;
   a control signal generation circuit operative to generate a control signal for changing, on the basis of an output from said oscillation circuit, a substrate potential in a direction to ensure a threshold level of a transistor so that it becomes greater; and
   a charge pump circuit including a capacitor and operative in response to said control signal to control the charge and discharge of said capacitor by to thereby change said substrate potential at two stages;
   wherein said charge pump circuit comprises: a capacitor series circuit comprised of said first mentioned capacitor and second capacitor connected in series through a first transistor, a second transistor for which conduction is controlled by a potential at the junction of said first transistor and said second capacitor, and operative to introduce a potential on the output terminal of said charge pump circuit to the junction of said first transistor and said first capacitor; a third transistor for introducing a potential at the junction of said first transistor and said first capacitor; a third transistor for introducing a potential at the junction of said first transistor and said first capacitor to a reference potential terminal; a first gate control circuit operative to control a gate voltage of said third transistor to allow said second and third transistors to be interchangeably conductive; and a second gate control circuit operative to allow said first transistor to be conductive within a time period during which said second transistor is non-conductive, to cause a change of the substrate potential of said second stage.

2. A substrate bias circuit as set forth in claim 1, wherein said second gate control circuit comprises: a third capacitor having one end supplied with a first control signal of which level changes only for a predetermined time period by an output from said oscillation circuit and the other end connected to the gate of said first transistor; and negative bias means connected to the gate electrode of the first transistor for allowing said first transistor to be more satisfactorily conductive by the connection of said third capacitor.

3. A substrate bias circuit as set forth in claim 2, wherein said negative bias means comprises fourth and fifth transistors diode-connected in a reverse-blocking direction, connected in parallel between said gate of said first transistor and said output terminal.

4. A substrate bias circuit as set forth in claim 2, wherein said negative bias means comprises: a fourth capacitor having one end supplied with a second control signal of which level changes at a timing faster than that of said first control signal; a sixth transistor diode-connected in a direction to prevent said second control signal from flowing into a portion between said fourth capacitor and said gate of said first transistor; and a seventh transistor diode-connected in a direction to prevent said reference potential from flowing into a portion between the other end of said fourth capacitor and said reference potential terminal.

5. A substrate bias circuit as set forth in claim 2, wherein said negative bias circuit is a resistor connected between said gate of said first transistor and an output terminal.

* * * * *